(12) United States Patent
    Spreitzer

(10) Patent No.: US 10,670,295 B2
(45) Date of Patent: Jun. 2, 2020

(54) VOLUME FLOW REGULATOR

(71) Applicant: Gruner AG, Wehingen (DE)

(72) Inventor: Wolfgang Spreitzer, Wehingen (DE)

(73) Assignee: GRUNER AG, Wehingen (DE)

( * ) Notice: Subject to any disclaimer, the term of this patent is extended or adjusted under 35 U.S.C. 154(b) by 0 days.

(21) Appl. No.: 16/274,128

(22) Filed: Feb. 12, 2019

(65) Prior Publication Data

US 2019/0178524 A1    Jun. 13, 2019

Related U.S. Application Data

(63) Continuation of application No. PCT/EP2017/066483, filed on Jul. 3, 2017.

(30) Foreign Application Priority Data

Aug. 19, 2016  (EP) ..................................... 16184849

(51) Int. Cl.
    *F24F 11/74*       (2018.01)
    *G05D 7/06*        (2006.01)
    (Continued)

(52) U.S. Cl.
    CPC ............ *F24F 11/745* (2018.01); *F24F 11/30* (2018.01); *F24F 11/62* (2018.01); *F24F 11/65* (2018.01);
    (Continued)

(58) Field of Classification Search
    CPC .. F24F 11/30; F24F 11/52; F24F 11/62; F24F 11/65; F24F 11/745; F24F 2110/00; F24F 2110/40; G05D 7/0623
    See application file for complete search history.

(56) References Cited

U.S. PATENT DOCUMENTS 4,476,874 A * 10/1984 Taenzer ................... A61B 8/06
                                                        600/441
5,161,100 A    11/1992 Whipple
(Continued)

FOREIGN PATENT DOCUMENTS

DE    20 2004 010819 U1   11/2004
EP       1 950 508 A2      7/2008
JP         9182178 A       7/1997

*Primary Examiner* — Chun Cao
(74) *Attorney, Agent, or Firm* — Hackler Daghighian Martino & Novak

(57) ABSTRACT

A volumetric flow controller for air conditioning and ventilation systems for displacing a control flap that is adjustably supported in the interior of a flow channel includes a differential pressure sensor for measuring a pressure difference prevailing in the flow channel. A control unit displaces the control flap depending on the pressure measured by the pressure sensor for adjusting a target volumetric flow in the flow channel. A first operating element is for selecting one of a plurality of parameters, in particular of control and/or configuration parameters. A second operating element is for adjusting the value of the respective selected parameter. A display is for displaying the currently set value of the respective selected parameter. The first operating element is a push button, a touch-sensitive switch, a touch-sensitive control panel or a contactless operating element for advancing the respective parameter displayed in the display.

15 Claims, 1 Drawing Sheet

(51) Int. Cl.
  *F24F 11/30* (2018.01)
  *F24F 11/65* (2018.01)
  *F24F 11/62* (2018.01)
  *F24F 110/40* (2018.01)
  *F24F 11/52* (2018.01)
  *F24F 110/00* (2018.01)
(52) U.S. Cl.
  CPC ............ *G05D 7/0623* (2013.01); *F24F 11/52* (2018.01); *F24F 2110/00* (2018.01); *F24F 2110/40* (2018.01)

(56) References Cited

U.S. PATENT DOCUMENTS

| | | | |
|---|---|---|---|
| 6,578,435 B2* | 6/2003 | Gould | G01F 1/36 |
| | | | 137/2 |
| 8,352,087 B2* | 1/2013 | Yli-Koski | G05D 7/0635 |
| | | | 700/13 |
| 2008/0178947 A1 | 7/2008 | Spreitzer | |
| 2009/0240376 A1 | 9/2009 | Elshafei et al. | |
| 2015/0324104 A1 | 11/2015 | Frerichs et al. | |

* cited by examiner

VOLUME FLOW REGULATOR

CROSS-REFERENCE TO RELATED APPLICATIONS

This continuation application claims priority to PCT/EP2017/066483 filed on Jul. 3, 2017, which has published as WO 2018/033288 A1 and also the European patent application number 16 184 849.4 filed on Aug. 19, 2016, the entire contents of which are fully incorporated herein with these references.

DESCRIPTION

Field of the Invention

The present invention relates to a volumetric flow controller, in particular for air conditioning and ventilation systems, for displacing a control flap that is pivotably supported in the interior of a flow channel, comprising a differential pressure sensor for measuring a pressure difference prevailing in the flow channel, a control unit that displaces the control flap to adjust a target volumetric flow in the flow channel depending on the pressure measured by the pressure sensor, a first operating element for selecting one of a plurality of parameters, in particular control and configuration parameters, a second operating element for adjusting the value of the respective selected parameter, and a display for displaying the value of the respective selected parameter.

BACKGROUND OF THE INVENTION

Such a volumetric flow controller for adjusting a volumetric flow through a flow channel in an air conditioning and ventilation system is known for example from EP 1 950 508 A2.

Such volumetric flow controllers are an important element of modern ventilation technology. They enable entire buildings or even only single rooms to be supplied with defined amounts of air by measuring, analyzing and regulating the air flows of the room air supply. A pressure difference in the flow channel is determined by means of a differential pressure sensor and an actual value is determined therefrom. Said value is compared with a stored target value in a controller. In the case of a deviation, the controller adjusts a control flap provided in the flow channel in order to set the volumetric flow accordingly between a minimum and a maximum permissible volumetric flow. In this case, the differential pressure sensor can be designed as a dynamic flow sensor or as a static pressure sensor. In both cases, height-independent VAV control should be possible. This is achieved with the simultaneous use of a further pressure sensor for determining the barometric air pressure of the surroundings. The differential pressure sensor provides a corrected signal proportional to the air speed in the flow channel.

The volumetric flow controller known from EP 1 950 508 A2 comprises a rotary switch as a first operating element for selecting one of a plurality of control and/or configuration parameters and a rotary knob as a second operating element for adjusting the value of the respective selected parameter. The currently set value of the parameter selected with the rotary switch is displayed on a display. A target parameter is selected by adjusting the rotary switch (parameter switch), for example using an externally applied scale, the value of said parameter being adjusted with the rotary knob (setting potentiometer or editing switch).

In the case of the volumetric flow controller known from DE 20 2004 010 819 U1, two potentiometers are provided for setting the minimum and maximum permissible volumetric flows. Using an externally applied scale, the minimum and maximum volumetric flows can be set without problems by means of a potentiometer in each case. The input of further control parameters (for example "maximum measurement range", normal or inverse direction of rotation of the control flap, etc.) and the display of the control drive data are carried out with a separate control part that is connected to the volumetric flow controller.

In the case of the volumetric flow controller known from U.S. Pat. No. 5,161,100, a switch is provided for setting each of the control parameters of a PI controller (proportional component, integration time). Further functions are the selection of configuration parameters that can be varied by the aforementioned switch.

By contrast, it is the object of the present invention to further simplify the operation of a volumetric flow and pressure controller of the aforementioned type.

SUMMARY OF THE INVENTION

This object is achieved according to the invention with the first operating element in the form of a push button, a touch-sensitive switch, a touch-sensitive control panel or a contactless operating element for advancing the respective parameter or parameter value displayed in the display.

According to the invention, by pressing the push button, by touching the touch-sensitive switch or control panel or by a contactless wiping or stroking gesture in front of the contactless operating element, the respective parameter or parameter value displayed in the display is advanced. If the target parameter is selected, the value thereof is adjusted with the second operating element. The editing is thus carried out by displacing the second operating element from its current position.

Particularly preferably, a scale with the selectable parameters is associated with the display and a marking that can be advanced along the scale by actuating the first operating element is displayed in the display, which indicates the respective displayed parameter on the scale. For the various control and configuration parameters, the display is used to display the function and the current value, so that the operating elements themselves do not require a scale applied to the exterior of the housing.

Control parameters can for example be:
Vmin: minimum permissible volumetric flow in % in relation to Vnom or in units of l/s or m3/h or cfm;
Vmax: maximum permissible volumetric flow in % in relation to Vnom or in units of l/s or m3/h or cfm;
Vnom: maximum measurement range/OEM-specific value, according to the used VAV box type or in units of l/s or m3/h or cfm;
Mode: type of operation: 0 . . . 10V/2 . . . 10V, normal or inverse direction of rotation of the control flap, configuration of optionally present sensor inputs, etc.;
Active Flow: current volumetric flow in % in relation to Vnom or in units of l/s or m3/h or cfm.

Configuration parameters can for example be:
Adr: communications parameters, such as for example address, speed, etc.;
Test: test functions that can be carried out independently of the external signals, in particular Vmin, Vmax, OFF, ON, etc.

Advantageously, the second operating element is implemented as a continuously rotatable rotary knob (for example an incremental encoder) for adjusting the value of the respective displayed parameter.

BRIEF DESCRIPTION OF THE DRAWINGS

Further advantages of the invention are revealed by the description and the figures. Likewise, the aforementioned features and the features yet to be mentioned are each used on their own or in any combination. The shown and described embodiment is not to be considered as an exhaustive list, but rather has an exemplary character for the description of the invention. In the figures.

DETAILED DESCRIPTION OF THE PREFERRED EMBODIMENTS

Figure 1:
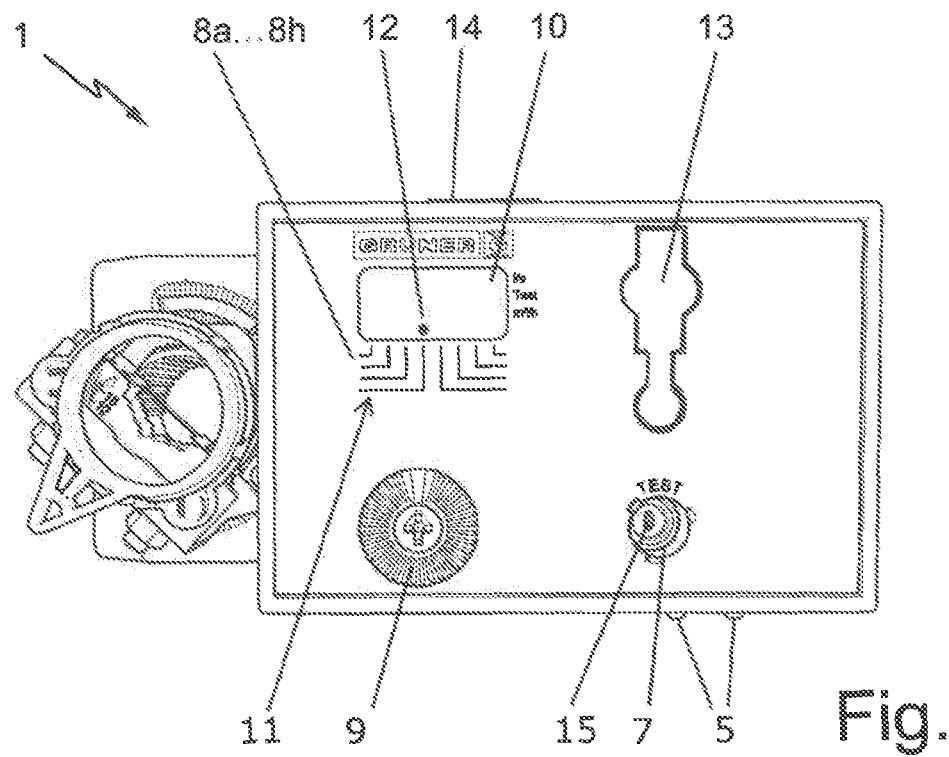
FIG. 1 shows the top view of the volumetric flow controller according to the invention.
Figure 2:
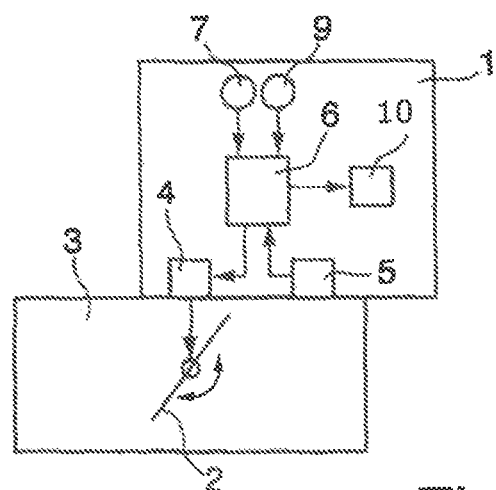
FIG. 2 shows schematically the inner workings of the volumetric flow controller of FIG. 1.

The volumetric flow controller 1 shown in FIGS. 1 and 2 is used for adjusting a volumetric flow in air conditioning and ventilation systems by means of a control flap 2 that is pivotably supported in the interior of a flow channel 3.

For this purpose, the volumetric flow controller 1 comprises an actuating drive 4 for pivoting the control flap 2, a differential pressure sensor 5 for measuring a pressure difference prevailing in the flow channel 3 and a control unit 6 that displaces the actuating drive 4 depending on the pressure in the flow channel 3 measured by the differential pressure sensor 5 to set a target pressure difference stored in the control unit 6, i.e. a target volumetric flow.

Furthermore, the volumetric flow controller 1 comprises a first operating element (parameter switch) 7 for selecting one of several control and/or configuration parameters 8a-8h of the control unit 6 and a second operating element 9 for adjusting the value of the respective selected parameter, as well as a display 10 for displaying the currently set value of the respective selected parameter. The display comprises background illumination to markedly improve legibility in dark surroundings. For this purpose, the contrast and the brightness can be optionally adjusted.

The first operating element 7 is used for advancing the respective parameter or the parameter value thereof displayed in the display 10, and can for example be implemented as a self-restoring push button, as shown in FIG. 2, or as a touch-sensitive switch or touch-sensitive control panel. The second operating element 9 can, as shown in FIG. 2, be implemented as a continuously rotatable rotary knob (setting potentiometer or editing switch) for adjusting the value of the respective displayed parameter. Alternatively, said operating elements 7, 9 can also be implemented entirely contactlessly in order to advance the respective parameter displayed in the display 10 contactlessly, for example by wiping and stroking gestures, or to adjust the parameter value.

In addition to the display 10, there is a scale 11 with the selectable parameters 8a-8h. A marking 12, here only by way of example a dot, is displayed in the display 10, which is advanced along the scale 11 by actuating the first operating element 7 and in doing so indicates the respective displayed parameter on the scale 11. In the exemplary embodiment shown, the scale comprises at least the control parameters Vmin, Vmax, Vnom, Mode, Active Flow and the configuration parameters Adr, Test.

The dot 12 is displayed in the display 10 by the first press of the push button 7, or is advanced by further pressing. The respective selected parameter 8a-8h is displayed on the scale 11 using the dot 12. If the target parameter is selected, the value thereof is adjusted by turning the rotary knob 9. The acquisition of the value in the control unit 6 is carried out by advancing to a new parameter within 10 s. If no value is acquired, after 10 s the currently valid parameter value is displayed in the display 10 again.

Furthermore, there is a diagnostic socket 13 for programming the control unit 6, even in the case of a non power supplied volumetric flow controller 1. Disconnecting a gearbox 14 allows the manual adjustment of the flap position and deactivates the control loop. A light emitting diode 15 transmits the current state of the control unit 6, for example voltage supply present, actual value=target value, etc.

What is claimed is:

1. A volumetric flow controller for air conditioning and ventilation systems, for displacing a control flap that is adjustably supported in an interior of a flow channel, comprises:
   a differential pressure sensor configured to measure a pressure difference prevailing in the flow channel;
   a control unit adjusting the control flap depending on the pressure measured by the pressure sensor, the control unit configured to adjust a target volumetric flow in the flow channel;
   a first operating element configured to select one of a plurality of parameters of control and/or configuration parameters;
   a second operating element configured to adjust the value of the respective selected parameter; and
   a display configured to display the currently set value of the respective selected parameter;
   wherein the first operating element is a push button, a touch-sensitive switch, a touch-sensitive operating panel or a contactless operating element to advance the respective parameter displayed in the display;
   wherein a scale with the selectable parameters is associated with the display and wherein a marking that can be advanced along the scale by actuation of the first operating element and that indicates the respective displayed parameter on the scale is displayed in the display.

2. The volumetric flow controller as claimed in claim 1, wherein the parameters are "minimum permissible volumetric flow" and/or "maximum permissible volumetric flow" and/or "maximum measurement range" and/or "operating type mode" and/or "active flow" and/or "operating type" and/or "communications parameter" and/or "test function" and/or "configuration".

3. The volumetric flow controller as claimed in claim 1, wherein the parameters are "minimum permissible volumetric flow" and/or "maximum permissible volumetric flow" and/or "maximum measurement range" and/or "operating type mode" and/or "active flow" and/or "operating type" and/or "communications parameter" and/or "test function" and/or "configuration".

4. The volumetric flow controller as claimed in claim 1, wherein the second operating element is implemented as a continuously rotatable rotary knob for adjusting the value of the respective displayed parameter.

5. The volumetric flow controller as claimed in claim 1, wherein the second operating element is implemented as a continuously rotatable rotary knob for adjusting the value of the respective displayed parameter.

6. The volumetric flow controller as claimed in claim 2, wherein the second operating element is implemented as a continuously rotatable rotary knob for adjusting the value of the respective displayed parameter.

7. The volumetric flow controller as claimed in claim 3, wherein the second operating element is implemented as a continuously rotatable rotary knob for adjusting the value of the respective displayed parameter.

8. The volumetric flow controller as claimed in claim 1, wherein the volumetric flow controller comprises an actuating drive configured to pivot the control flap.

9. The volumetric flow controller as claimed in claim 1, wherein the volumetric flow controller comprises an actuating drive configured to pivot the control flap.

10. The volumetric flow controller as claimed in claim 2, wherein the volumetric flow controller comprises an actuating configured to pivot the control flap.

11. The volumetric flow controller as claimed in claim 3, wherein the volumetric flow controller comprises an actuating configured to pivot the control flap.

12. The volumetric flow controller as claimed in claim 4, wherein the volumetric flow controller comprises an actuating configured to pivoting the control flap.

13. The volumetric flow controller as claimed in claim 5, wherein the volumetric flow controller comprises an actuating drive configured to the control flap.

14. The volumetric flow controller as claimed in claim 6, wherein the volumetric flow controller comprises an actuating configured to pivot the control flap.

15. The volumetric flow controller as claimed in claim 7, wherein the volumetric flow controller comprises an actuating configured to pivot the control flap.

* * * * *

UNITED STATES PATENT AND TRADEMARK OFFICE
CERTIFICATE OF CORRECTION

PATENT NO. : 10,670,295 B2  
APPLICATION NO. : 16/274128  
DATED : June 2, 2020  
INVENTOR(S) : Wolfgang Spreitzer Page 1 of 1

It is certified that error appears in the above-identified patent and that said Letters Patent is hereby corrected as shown below:

In the Claims

Column 5, Claim 10, Lines 16 to 17, "actuating configured" should read --actuating drive configured--.

Column 5, Claim 11, Lines 19 to 20, "actuating configured" should read --actuating drive configured--.

Column 5, Claim 12, Lines 22 to 23, "actuating configured" should read --actuating drive configured--.

Column 5, Claim 14, Lines 28 to 29, "actuating configured" should read --actuating drive configured--.

Column 5, Claim 15, Lines 31 to 32, "actuating configured" should read --actuating drive configured--.

Signed and Sealed this  
Fourth Day of August, 2020

Andrei Iancu  
*Director of the United States Patent and Trademark Office*